United States Patent
Bouzguarrou et al.

(10) Patent No.: US 10,860,324 B1
(45) Date of Patent: Dec. 8, 2020

(54) APPARATUS AND METHOD FOR MAKING PREDICTIONS FOR BRANCH INSTRUCTIONS

(71) Applicant: Arm Limited, Cambridge (GB)

(72) Inventors: Houdhaifa Bouzguarrou, Valbonne (FR); Guillaume Bolbenes, Antibes (FR); Eddy Lapeyre, Antibes (FR); Luc Orion, Mouans Sartoux (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/431,881

(22) Filed: Jun. 5, 2019

(51) Int. Cl.
   *G06F 9/38* (2018.01)
(52) U.S. Cl.
   CPC .......... *G06F 9/3844* (2013.01); *G06F 9/3806* (2013.01)
(58) Field of Classification Search
   None
   See application file for complete search history.

(56) References Cited

U.S. PATENT DOCUMENTS

| | | | |
|---|---|---|---|
| 5,226,130 A * | 7/1993 | Favor | G06F 9/3804 711/125 |
| 6,351,796 B1 * | 2/2002 | McCormick, Jr. | G06F 9/3806 711/122 |
| 7,430,657 B2 * | 9/2008 | Gat | G06F 9/3844 712/240 |
| 2007/0233964 A1 * | 10/2007 | Robinson | G06F 12/0864 711/136 |
| 2011/0093658 A1 * | 4/2011 | Zuraski, Jr. | G06F 9/3844 711/125 |
| 2014/0337605 A1 * | 11/2014 | Hall | G06F 9/3838 712/239 |
| 2016/0275288 A1 * | 9/2016 | Sethumadhavan | H04L 63/0428 |
| 2018/0121203 A1 * | 5/2018 | Ishii | G06F 9/3806 |

* cited by examiner

*Primary Examiner* — Eric Coleman
(74) *Attorney, Agent, or Firm* — Nixon & Vanderhye P.C.

(57) ABSTRACT

An apparatus and method are provided for making predictions for branch instructions. The apparatus has a prediction queue for identifying instructions to be fetched for execution, and branch prediction circuitry for making predictions in respect of branch instructions, and for controlling which instructions are identified in the prediction queue in dependence on the predictions. During each prediction iteration, the branch prediction circuitry makes a prediction for a predict block comprising a sequence of M instructions. The branch prediction circuitry comprises a target prediction storage having a plurality of entries that are used to identify target addresses for branch instructions that are predicted as taken, the target prediction storage being arranged as an N-way set associative storage structure comprising a plurality of sets. Each predict block has an associated set within the target prediction storage. The branch prediction circuitry further comprises a high branch density (HBD) tracker arranged to identify, as a HBD predict block, a predict block whose sequence of M instructions contains more than N branch instructions. For each identified HBD predict block, at least one additional set is identified in the target prediction storage to be used in addition to the associated set to identify target addresses for branch instructions that are predicted as taken within that HBD predict block.

20 Claims, 10 Drawing Sheets

APPARATUS AND METHOD FOR MAKING PREDICTIONS FOR BRANCH INSTRUCTIONS

BACKGROUND

The present technique relates to an apparatus and method for making predictions for branch instructions.

Within a data processing apparatus, processing circuitry may be provided for executing instructions. A prediction queue may be provided to identify instructions to be fetched from memory for execution by the processing circuitry.

Typically, instructions from sequential addresses in memory will be executed until a branch instruction is encountered. In particular, execution of such a branch instruction may cause a discontiguous change in the address, such that the next instruction executed after the branch instruction is at a target address determined for the branch instruction, rather than the immediately following instruction within the instruction address space. In order to seek to ensure that the prediction queue identifies the instructions that actually require execution by the processing circuitry, it is known to provide branch prediction circuitry to make predictions in respect of such branch instructions, for example to identify whether those branch instructions will be taken or not taken, and, if those branch instructions are taken, to predict the target address identifying the next instruction to be executed. The predictions made by the branch prediction circuitry can then be used to control which instructions are identified in the prediction queue.

The branch prediction circuitry may be arranged, during each prediction iteration (i.e. each time the branch prediction circuitry is accessed in order to make a prediction), to consider a predict block comprising a plurality of instructions at sequential addresses in memory so as to output prediction information for each predict block. Such an approach can improve performance by enabling multiple instructions to be added into the prediction queue per prediction iteration. However, when the predictions made in respect of a predict block are inaccurate, this can significantly impact performance, and accordingly it is desirable to seek to reduce the likelihood of mispredictions being made by the branch prediction circuitry.

SUMMARY

In one example arrangement, there is provided an apparatus comprising: a prediction queue to identify instructions to be fetched for execution by processing circuitry; and branch prediction circuitry to make predictions in respect of branch instructions, and to control which instructions are identified in the prediction queue in dependence on the predictions; wherein: the branch prediction circuitry is arranged, during each prediction iteration, to make a prediction for a predict block comprising a sequence of M instructions, in order to identify whether that predict block contains a branch instruction that is predicted as taken; the branch prediction circuitry comprises a target prediction storage having a plurality of entries that are used to identify target addresses for branch instructions that are predicted as taken, wherein the target prediction storage is arranged as an N-way set associative storage structure comprising a plurality of sets, each set comprises an entry from each way of the N-way set associative storage structure, and each predict block has an associated set within the target prediction storage; and the branch prediction circuitry further comprises a high branch density (HBD) tracker arranged to identify, as a HBD predict block, a predict block whose sequence of M instructions contains more than N branch instructions, for each HBD predict block identified by the HBD tracker at least one additional set being identified in the target prediction storage to be used in addition to the associated set to identify target addresses for branch instructions that are predicted as taken within that HBD predict block.

In another example arrangement, there is provided a method of making predictions for branch instructions, comprising: identifying within a prediction queue instructions to be fetched for execution by processing circuitry; employing branch prediction circuitry to make predictions in respect of branch instructions, and to control which instructions are identified in the prediction queue in dependence on the predictions, wherein, during each prediction iteration, a prediction is made for a predict block comprising a sequence of M instructions, in order to identify whether that predict block contains a branch instruction that is predicted as taken; providing a target prediction storage having a plurality of entries that are used to identify target addresses for branch instructions that are predicted as taken, wherein the target prediction storage is arranged as an N-way set associative storage structure comprising a plurality of sets, each set comprises an entry from each way of the N-way set associative storage structure, and each predict block has an associated set within the target prediction storage; and providing a high branch density (HBD) tracker to identify, as a HBD predict block, a predict block whose sequence of M instructions contains more than N branch instructions, for each HBD predict block identified by the HBD tracker at least one additional set being identified in the target prediction storage to be used in addition to the associated set to identify target addresses for branch instructions that are predicted as taken within that HBD predict block.

In a still further example arrangement, there is provided an apparatus comprising: prediction queue means for identifying instructions to be fetched for execution by processing circuitry; and branch prediction means for making predictions in respect of branch instructions, and to control which instructions are identified in the prediction queue means in dependence on the predictions; wherein: the branch prediction means, during each prediction iteration, for making a prediction for a predict block comprising a sequence of M instructions, in order to identify whether that predict block contains a branch instruction that is predicted as taken; the branch prediction means comprises a target prediction storage means having a plurality of entries for identifying target addresses for branch instructions that are predicted as taken, wherein the target prediction storage means is arranged as an N-way set associative storage structure comprising a plurality of sets, each set comprises an entry from each way of the N-way set associative storage structure, and each predict block has an associated set within the target prediction storage means; and the branch prediction means further comprises a high branch density (HBD) tracker means for identifying, as a HBD predict block, a predict block whose sequence of M instructions contains more than N branch instructions, for each HBD predict block identified by the HBD tracker means at least one additional set being identified in the target prediction storage means to be used in addition to the associated set to identify target addresses for branch instructions that are predicted as taken within that HBD predict block.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
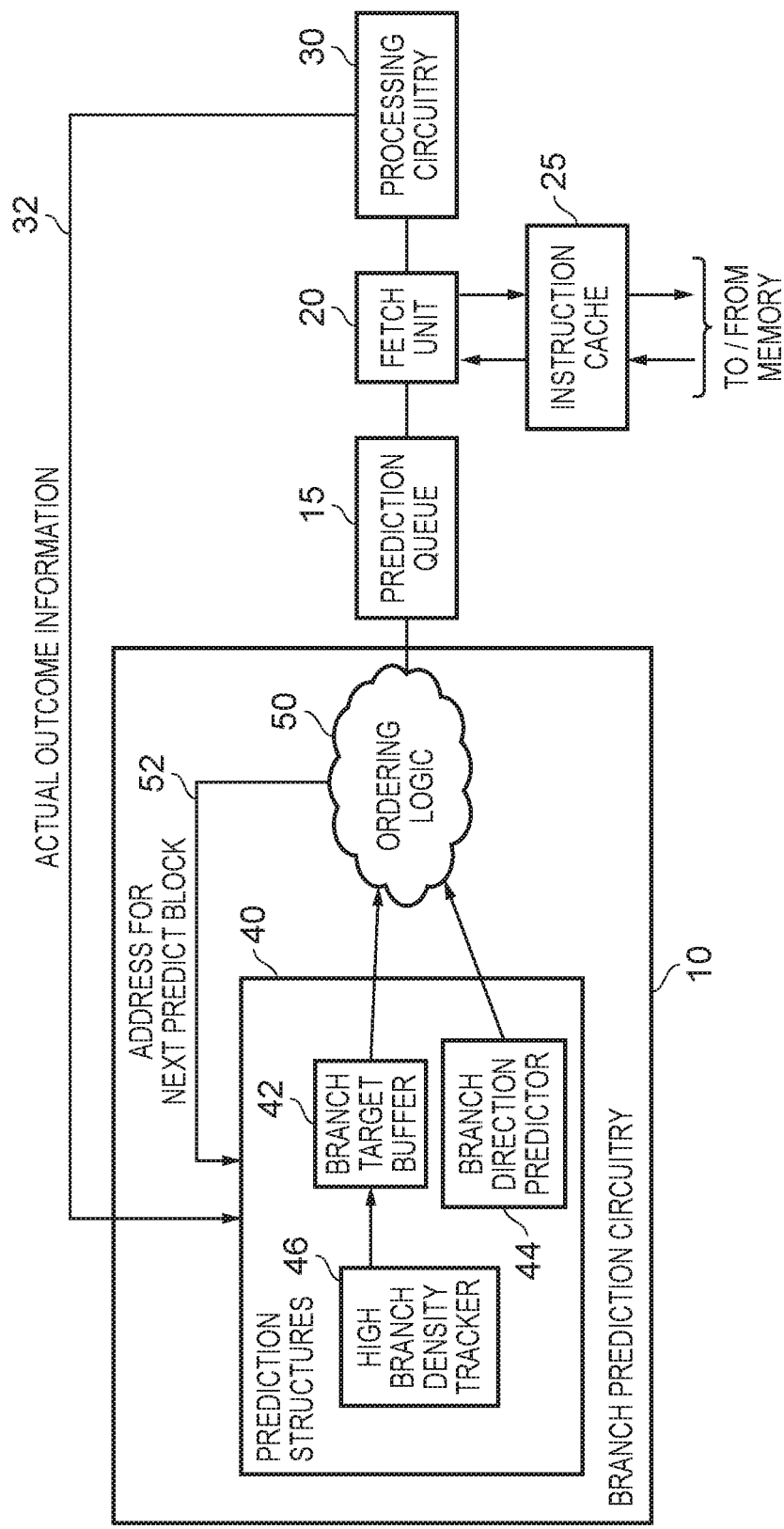
FIG. 1 is a block diagram of a system in accordance with one example arrangement.

In one example arrangement an apparatus is provided that has a prediction queue to identify instructions to be fetched for execution by processing circuitry, and branch prediction circuitry to make predictions in respect of branch instructions, and to control which instructions are identified in the prediction queue in dependence on the predictions. The branch prediction circuitry is arranged, during each prediction iteration, to make a prediction for a predict block comprising a sequence of M instructions, in order to identify whether that predict block contains a branch instruction that is predicted as taken.

The branch prediction circuitry comprises a target prediction storage having a plurality of entries that are used to identify target addresses for branch instructions that are predicted as taken, and the target prediction storage is arranged as an N-way set associative storage structure comprising a plurality of sets. Each set comprises an entry from each way of the N-way set associative storage structure, and each predict block has an associated set within the target prediction storage. It should be noted that the associated set for a predict block may also be the same set that is associated with one or more other predict blocks, and hence the associated set may not be uniquely for use by any particular predict block. However, by arranging the target prediction storage as an N-way set associative storage structure, it will be appreciated that the associated set can store information for up to N instructions within a predict block, and in particular can identify target address information for up to N branch instructions within that predict block.

The number of ways within the set associative storage structure is a matter of design choice. However, increasing the associativity (i.e. the number of ways) provided within the target prediction storage can have a significant impact on power consumption, since it will typically be the case that each of the ways will need to be accessed during each lookup operation.

Hence, in one example implementation, the associativity of the target prediction storage may be chosen to take into account the typical maximum number of branch instructions expected to be observed within a predict block, which would allow the associated set to be used to identify target address information for each of those branch instructions. However, it has been noticed that in some instances there can be one or more predict blocks that have a larger number of active branch instructions (i.e. branch instructions that may regularly be taken), and in particular have a number of active branch instructions that exceeds the associativity of the target prediction storage. In such situations, the branch prediction circuitry may not be able to produce accurate prediction information for those branch instructions, and this can lead to eviction of useful entries in the target prediction storage, and extra mispredictions. Whilst such predict blocks may be relatively infrequent, the mispredictions arising in respect of those predict blocks can have a significant adverse effect on performance. However, as mentioned earlier, it would be significantly costly in terms of power consumption to arrange for the target prediction storage to have an associativity large enough to accommodate such relatively rare predict blocks. The techniques described herein provide a mechanism that allows the prediction accuracy to be increased for such predict blocks, but without needing to increase the associativity of the target prediction storage.

In particular, in accordance with the techniques described herein, the branch prediction circuitry may be arranged to further comprise a high branch density (HBD) tracker that is arranged to identify, as a HBD predict block, a predict block whose sequence of M instructions contains more than N branch instructions. For each HBD predict block identified by the HBD tracker, at least one additional set can then be identified in the target prediction storage to be used in addition to the associated set to identify target addresses for branch instructions that are predicted as taken within the HBD predict block.

Typically, the associated set for a predict block will be determined from address information for the predict block. For instance, an index portion of that address can be used to identify a particular set within the N-way set associative storage structure, that set being the associated set that is by default used to store target address information for branch instructions appearing within that predict block. However, once the HBD tracker identifies a predict block as an HBD predict block, then one or more additional sets can be identified in the target prediction storage for use in addition to the associated set. By such an approach, additional entries within the target prediction storage can be identified for use in relation to a predict block that has been identified as an HBD predict block, and thus enable more than N entries to be available for use in relation to such an HBD predict block even though the target prediction storage is an N-way set associative storage structure.

The HBD tracker can be arranged in a variety of ways. However, in one example implementation the HBD tracker has a plurality of HBD entries, each HBD entry being allocated to identify a predict block for which at least one entry has been allocated within the target prediction storage. The HBD tracker is then arranged, for a given predict block that has an allocated HBD entry, to monitor allocation activity within the entries of the target prediction storage for that given predict block, in order to identify a trigger condition where that given predict block is to be identified as a HBD predict block. Hence, when a predict block is allocated into one of the HBD entries, it may not at that time of allocation be known whether that predict block is to be treated as an HBD predict block. However, subsequent to allocation of an HBD entry within the HBD tracker, the allocation activity within the target prediction storage for that given predict block can be monitored in order to determine whether that predict block should be treated as an HBD predict block.

In particular, a relatively large number of allocations into the target prediction storage may be indicative of the predict block being an HBD predict block, i.e. being a predict block that has more than N active branch instructions within it, and hence for which allocations are frequently being made to capture target address information for those branch instructions. In particular, it will be appreciated that when the number of active branch instructions exceeds N, then an allocation may be evicting target address information used for another one of the active branch instructions within the predict block and then in due course an allocation for that evicted target address information will need to be re-made within the target prediction storage, and accordingly there can be a "churn" of information being allocated, evicted, re-allocated, re-evicted, etc.

There are a number of ways in which the allocation activity within the entries of the target prediction storage can be monitored within HBD entries. However, in one example implementation, each HBD entry comprises an allocation counter field to identify an allocation count indicative of a number of allocations made within the target prediction storage for the predict block allocated in that HBD entry. The HBD tracker is then arranged to prevent the trigger condition being identified until the allocation count reaches a threshold value. Hence, only once the allocation count has reached a threshold value will the HBD tracker consider identifying the associated predict block as being an HBD predict block.

Whilst in some implementations the use of such an allocation counter mechanism may be considered sufficient to enable a decision to be made as to whether a given predict block is an HBD predict block, in other implementations additional information can also be maintained in order to factor into that decision. For example, whilst the allocation count being relatively large may indicate that a given predict block is likely to be an HBD predict block, there could be other reasons why the allocation count is relatively large. For example, there could be thrashing between two or more predict blocks that share the same associated set. Hence, for example, allocations made in respect of a first predict block may cause entries to be evicted that relate to a second predict block, and similarly allocations made in respect of the second predict may cause evictions of entries relating to the first predict block. Hence, in one example implementation, in order to seek to distinguish between such a scenario and the earlier-mentioned scenario where a given predict block is in fact an HBD predict block, each HBD entry may further comprise a branch threshold field to provide an indication of whether the predict block allocated in that HBD entry has more than N branch instructions. The HBD tracker may then be arranged to identify the trigger condition for the given predict block when both the branch threshold field indicates that the given predict block has more than N branch instructions and the allocation count for the given predict block has reached the threshold value. When both of these conditions are met, the associated predict block can be identified as an HBD predict block.

There are a number of ways in which the branch threshold field could be populated. For example, feedback information provided from instruction decode circuitry, and/or the processing circuitry that executes the instructions, may identify situations where the predict block contains more than N branch instructions, and in particular that information can identify the actual number of branch instructions within the predict block. Once that feedback information has been provided, then that information could be allocated within the branch threshold field. However, it will be appreciated that that information will not directly identify whether each of those branch instructions is active, and hence whether target address information is actually required for each of those branch instructions.

As another example, if a read modify write process is used to update the target prediction storage when a new entry is being allocated, i.e. when new target address information is being allocated into the associated set, then at that time it can be determined how many of the existing entries are allocated to branch instructions within the same predict block. Hence, if all of the entries within the associated set are allocated for target address information for branch instructions within a given predict block, and the new allocation is also seeking to identify target address information for another branch instruction within the given predict block, this indicates a situation where the number of branch instructions exceeds N, and accordingly at that point that information may be flagged within the branch threshold field. However, it will be appreciated that this only provides a relatively coarse indication within the branch threshold field, and in particular does not capture information about the absolute number of branch instructions within the predict block.

In accordance with one example implementation, an alternative approach is taken where the branch threshold field comprises an M-bit vector, where each bit is associated with an instruction position within the predict block. The HBD tracker is then arranged, in response to an entry being allocated within the target prediction storage for a branch instruction at a specified instruction position within the given predict block, to set within the M-bit vector the associated bit for that specified instruction position. As a result, the branch threshold field will then indicate that the given predict block allocated in that HBD entry has more than N branch instructions when the number of set bits in the M-bit vector exceeds N.

In one example implementation, the M-bit vector is sticky, such that once a bit has been set that bit remains set until the HBD entry is invalidated. Hence, in situations where the given predict block is indeed an HBD predict block, it will be expected that the M-bit vector will have additional bits set over time, such that the actual number of active branch instructions within the predict block will be captured by the content of the M-bit vector.

There are a number of ways in which a predict block that has been allocated an HBD entry within the HBD tracker can be identified as being an HBD predict block. For instance, an assessment as to whether the trigger condition is present could be made each time that HBD entry is accessed. However, in one implementation each HBD entry contains an active flag which is set once the predict block allocated in that HBD entry is considered to be an HBD predict block. This avoids the need to re-assess whether the trigger condition is present each time the HBD entry is used, and instead the active flag can merely be referenced in order to determine whether the HBD entry identifies an HBD predict block.

There are a number of ways in which the at least one additional set may be determined. For example, in one implementation the at least one additional set is determined with reference to the associated set. As mentioned earlier, the associated set may typically be identified using an index portion of the address used to identify the predict block. A predetermined manipulation of the index bits could then be performed in order to identify each additional set. For example, the target prediction storage could be arranged as a plurality of banks, and the index portion of the address may include an associated number of banking bits used to identify a particular bank. Those banking bits could be manipulated in a predetermined manner in order to identify each additional set. Hence, by way of specific example, if the target prediction storage is organised as two banks, there will be a single banking bit, and the state of that banking bit could be flipped in order to identify an additional set to be used in addition to the associated set determined using the index portion of the address. By arranging for the additional set to be in a different bank to the associated set, this can improve performance, as this may enable both the associated set and the additional set to be accessed in parallel.

However, it is not a requirement for the associated set and each additional set to be in different banks, nor is it a requirement that the determination of the additional set is predetermined, for example by manipulating the index bits used to identify the associated set in some pre-ordained manner. For instance, in an alternative implementation each HBD entry may contain an additional set identifier field to provide information used to determine each additional set to be used in addition to the associated set to identify target addresses for branch instructions that are predicted as taken within the HBD predict block allocated in that HBD entry. This provides a great deal of flexibility as to how each additional set is identified, and in particular there is no need for any predetermined relationship between each additional set and the associated set. Further, it may be possible to maintain performance in such an implementation, for example by arranging the target prediction storage as a multi-ported device, enabling multiple sets to be accessed in parallel.

In one example implementation, it may be the case that there is merely one additional set used when a predict block is identified as an HBD predict block. However, in an alternative implementation the number of additional sets used may be configurable, for example to take into account information about the actual number of branch instructions within the HBD predict block. In particular, as the number of branch instructions gets larger, it may be appropriate to use more than one additional set. In such implementations, each HBD entry may be arranged to contain an additional set number field to identify a number of additional sets to be used in addition to the associated set, and hence for example to identify situations where more than one additional set is to be used.

In one implementation, once an additional set has been identified for use in association with a certain HBD predict block, then any of the ways in that additional set may be used to store target address information for branch instructions appearing within that HBD predict block. However, if desired, the target prediction storage can be constrained to only use a subset of the ways in such an additional set to identify target addresses for branch instructions within the HBD predict block. Purely by way of example, if the target prediction storage is arranged as a four-way set associative storage structure, and it is known that the number of active branch instructions within a given predict block is 5, it may be sufficient to merely allocate one of the ways within the additional set to be used to store target address information for that given predict block. Such an approach can lead to power consumption savings, for example by allowing power gating techniques to be used when accessing the additional set when performing a lookup for that given predict block, since only a subset of the ways in the additional set will need to be accessed.

In such implementations, each HBD entry may be arranged to provide way identifier information that is used to identify a subset of the ways in each additional set to be used to identify target addresses for branch instructions that are predicted as taken within the HBD predict block allocated in that HBD entry.

When seeking to allocate a predict block into an HBD entry of the HBD tracker, it will typically be necessary to select a victim entry whose current contents are to be overwritten by the contents pertaining to the newly allocated predict block. Any suitable allocation policy can be used for this purpose, but in one example implementation the allocation policy may be arranged to preferentially select as a victim entry an entry that does not currently store a predict block that has already been identified to be an HBD predict block.

However, even if the above approach is used, it may still be possible that the victim entry selected already stores information relating to an HBD predict block, for example in situations where all of the entries store information relating to predict blocks that have been identified to be HBD predict blocks. In one example implementation, it may be considered appropriate not to immediately overwrite the current contents of such a victim entry, but instead to allow that content to persist for a period of time without being overwritten. In one example implementation this can be achieved through the use of a lock counter. In particular, in one example arrangement, each HBD entry contains a lock counter field to provide a lock counter value, the lock counter value being set to an initial value when the predict block allocated into that entry is identified as a HBD predict block.

Thereafter, the lock counter value may be adjusted by a predetermined amount each time the associated HBD entry is chosen as a victim entry during a HBD entry allocation process, but the information currently stored in the associated HBD entry is maintained as valid until the lock counter value reaches a final value. The initial value and the final value is a matter of design choice, and will depend for example on whether the lock counter value is incremented or decremented each time the associated HBD entry is chosen as a victim entry. In one particular example arrangement, the initial value is a chosen positive value, and the lock counter value is decremented each time the associated HBD entry is chosen as a victim entry. In such an arrangement, the final value may be a zero value, such that in situations where the victim entry chosen during an HBD entry allocation process already contains information relating to an HBD predict block, that content will only be overwritten if the lock counter value is zero. Otherwise, the information will be maintained, and an allocation will not be made at that time for the newly identified predict block.

The HBD tracker can be referenced during a number of the processes performed in relation to the target prediction storage. For example, the branch prediction circuitry may be arranged, when allocating an entry within the target prediction storage for a branch instruction within a chosen predict block, to access the HBD tracker to determine whether the chosen predict block is a HBD predict block and, when the chosen predict block is a HBD predict block, to select the entry to be allocated for the branch instruction from amongst the entries in the associated set and the at least one additional set. Hence, if at the time of allocating an entry for a particular predict block, the HBD tracker indicates that that predict block is an HBD predict block, then any of the associated set and the at least one additional set can be used to identify the entry into which that information is to be allocated. Conversely, if the HBD tracker identifies that the predict block is not currently identified as an HBD predict block (for example because there is a hit in the HBD tracker but the entry is not yet flagged to identify that the predict block is an HBD predict block, or alternatively because there is a miss in the HBD tracker), then the entry chosen for allocation will be an entry within the associated set.

As another example of a process during which the HBD tracker will be referenced, the branch prediction circuitry may be arranged, when making a prediction for a current predict block, to determine with reference to the HBD tracker whether the current predict block is a HBD predict block and, when the current predict block is a HBD predict block, to perform a lookup in both the associated set and the at least one additional set in order to retrieve the target addresses for branch instructions that are predicted as taken within the current predict block. Hence, in situations where the HBD tracker identifies that the current predict block is an HBD predict block, the lookup process can be expanded so that not only the associated set is subjected to a lookup, but also the at least one additional set is subjected to a lookup. The results from the various lookup procedures can then be combined, thereby potentially increasing the number of branch instructions within the predict block for which target address information can be provided by the target prediction storage.

In one example implementation, the HBD tracker can be a unitary structure such that a single entry within the HBD tracker provides all of the required information for the predict block allocated into that entry. However, in an alternative implementation, the HBD tracker may comprise a monitor storage structure comprising a plurality of monitor entries and an active storage structure comprising a plurality of active entries. Each HBD entry is then initially provided by a monitor entry in the monitor structure, but when the associated predict block allocated in that HBD entry is identified as an HBD predict block the HBD entry is arranged to at least comprise an active entry in the active storage structure. Hence, in such an arrangement the monitor entries can be used during a training phase, where it is seeking to be determined whether the allocated predict block should be identified as an HBD predict block. Thus, the earlier-mentioned allocation counter field and branch threshold field may be provided within such monitor entries. However, once it has been determined that the predict block allocated into such a monitor entry is to be identified as an HBD predict block, then a corresponding active entry may be allocated to store the required information pertaining to that HBD predict block. The active entries can then be reviewed when performing allocations into the target prediction storage, or when performing prediction lookups within the target prediction storage.

By such an arrangement, it is possible to further optimise timing and storage within the HBD tracker. In particular, active entry space only needs to be allocated for predict blocks that have actually been identified as HBD predict blocks, thus reducing storage requirements when compared with an equivalent unitary structure of HBD tracker. Further only the active structure needs to be subjected to a lookup at prediction time, and this provides improved timing due to the reduced size structure accessed during the lookup when compared with an equivalent unitary structure of HBD tracker. This timing benefit is further enhanced by the fact that the lookup result can be used during the same cycle to compute the correct BTB index.

In one example implementation, once a predict block has been identified as an HBD predict block, then an active entry in the active storage structure may be allocated for that predict block, and the associated monitor entry may be invalidated so as to allow that entry to be re-allocated for a different predict block. However, in an alternative implementation, when the associated predict block allocated in the HBD entry is identified as a HBD predict block, the HBD entry is expanded so as to comprise both the monitor entry and the active entry.

The branch prediction circuitry may comprise a number of additional components in addition to the target prediction storage and the HBD tracker. For example, in one implementation the branch prediction circuitry further comprises branch direction prediction circuitry to produce branch direction prediction information providing an indication of each branch instruction within a current predict block that is predicted as being taken. Ordering circuitry may also then be provided to seek to determine whether there is at least one branch instruction in the current predict block that is predicted as taken and for which a target address is identified in the target prediction storage, and in the event that there is more than one branch instruction in the current predict block that is predicted as taken and for which a target address is identified in the target prediction storage, to determine a first of said more than one branch instructions appearing within the predict block.

In such implementations, it may be the case that the branch direction prediction circuitry is able to make a branch direction prediction for potentially every instruction within the predict block, and hence may be able to handle a scenario where every instruction within the current predict block is a branch instruction. However, prior to adoption of the techniques described herein, the number of branch instructions for which target address information could be identified by the target prediction storage would be significantly more limited, and in particular limited by the associativity of the storage structure used to implement the target prediction storage. However, when using the mechanism described herein, allowing certain predict blocks to be identified as HBD predict blocks, and then for one or more additional sets to be used in addition to the associated set to identify target address information, this allows target address information for significantly more branch instructions to be captured within the target prediction storage without needing to increase the associativity of the target prediction storage, and hence can increase the prediction accuracy of the branch prediction circuitry.

Particular examples will now be described with reference to the Figures.

FIG. 1 is a block diagram of a data processing apparatus in accordance with one example implementation. The apparatus includes processing circuitry 30 for executing a sequence of instructions that have been fetched by a fetch unit 20. The fetch unit has access to one or more levels of cache, for example the instruction cache 25 and any lower levels of cache within a cache hierarchy, and initially seeks to fetch instructions from the instruction cache 25. In the event of a cache miss, requests are propagated to a lower level of the cache hierarchy and/or main memory, in order to retrieve into the fetch unit the instructions that need executing.

Exactly which instructions are fetched by the fetch unit is dictated by the output of a prediction queue 15 which includes storage to maintain a series of prediction results produced by branch prediction circuitry 10, with those prediction results being used to determine a sequence of instructions to be fetched for execution by the processing circuitry. As will be understood by those skilled in the art, when stepping through a sequence of instructions at sequential memory addresses, when a branch instruction is encountered this can cause a change in instruction flow, dependent on whether the branch instruction is taken or not taken. If the branch is not taken, then the next instruction to be executed will typically be the instruction immediately following the branch instruction (i.e. the one at the next incremented memory address) but if the branch is taken then instructions flow will branch to a target address that is determined for that branch instruction, such that the next instruction to be executed will be an instruction at that target address. Often, branch instructions can be conditional, and hence for any particular conditional branch instruction it will not always be the case that the branch is taken or not taken. Branch prediction circuitry 10 can be used to seek to make predictions as to whether a branch will be taken or not taken, and/or to predict target addresses for taken branches, and may include a variety of different types of branch prediction components for use in making such predictions. Often, one or more of those components will operate based on knowledge of the previous history of actual execution by the processing circuitry, with that information being forwarded over path 32 back to the branch prediction circuitry 10.

The branch prediction circuitry 10 may be arranged to review blocks of instructions at a time, and each block is referred to herein as a predict block. The predict block will in one implementation include a number of consecutive instructions in the memory address space, for example eight consecutive instructions. The branch prediction circuitry will seek to analyse the block of instructions in order to predict whether one or more of those instructions are branch instructions. In situations where the predict block contains at least one branch instruction, the branch prediction circuitry will seek to identify the location within the predict block of the first branch instruction that is predicted as taken, if any, and in that event will seek to predict a target address for that branch instruction.

The branch prediction circuitry 10 includes a number of prediction structures 40 that are used during this process. In particular, a branch direction predictor 44 is used to predict the taken/not taken behaviour of each branch instruction within the predict block. This information is then output to the ordering logic 50 for use in combination with other information produced by the prediction structures 40. The information output by the branch direction predictor 44 can take a variety of forms, but in one example may consist of a vector comprising a bit for each instruction position within the predict block, and with the value of that bit being set to identify whether that instruction is predicted to be a taken branch, or is not predicted to be a taken branch. By way of specific example, a logic one value may be used to indicate a taken branch, and a logic zero value may be used to indicate that the instruction is not considered to be a taken branch. It will be appreciated that the logic zero value can be used irrespective of whether the instruction at that instruction position within the predict block is a branch instruction predicted not to be taken, or is any other non-branch instruction, since the cases of interest are the cases where the instruction is considered to be a branch instruction that is taken, as can be indicated by the logic one values within the vector produced by the branch direction predictor.

Assuming the vector received from the branch direction predictor 44 has at least one bit set to a logic one value, indicating that there is at least one branch instruction within the predict block that is predicted as taken, then in order for the branch prediction circuitry to make a prediction for such a taken branch instruction it may be necessary for a target address to be available from the branch target buffer 42. In particular, the branch target buffer is arranged to provide a plurality of entries, where each entry can store target address information for branch instructions.

In accordance with the techniques described herein, the branch target buffer (BTB) 42 is arranged as an N-way set associative storage structure comprising a plurality of sets. Each set then comprises an entry from each of the ways in the N-way set associative storage structure, and each predict block has an associated set within the BTB. In particular, using an indicated address for a predict block, an index portion of the address can be used to identify a particular set, and then a lookup can be performed within the entries of that set. During the lookup procedure, a tag portion of the address for the predict block can be compared with a tag value stored within each entry, and if a match is detected this indicates a hit within that entry. The contents of that entry can then be provided to the ordering logic 50.

The information output from a hit entry can identify an offset value, this identifying the instruction position within the predict block, and can also provide a target address for that instruction. Using this information, and the vector output by the branch direction predictor 44, the ordering logic 50 can seek to determine the first branch instruction within the predict block that is both predicted as taken, and for which a target address is available from the BTB. In that instance, that information can be used to form the prediction result that is output to the prediction queue. For example, the prediction result may identify a sequence of instructions within the predict block, terminating with the branch instruction that is predicted as taken, and for which a target address has been predicted. That target address can then be used by the ordering logic 50 to form the address for the next predict block that is then routed over path 52 back to the prediction structures 40 for a subsequent prediction iteration.

In the event that there are no branch instructions predicted as taken, or the BTB is unable to provide a target address for any branch instruction that is predicted as taken, then the prediction result will merely identify a sequence of instruction from the predict block terminating with the last instruction in the predict block, and the address for the next predict block will be determined to identify the next consecutive sequence of instructions following the last instruction in the current predict block.

Provided a good level of accuracy is achieved by the branch prediction circuitry 10, it will be appreciated that a steady stream of instructions for execution by the processing circuitry can be identified within the prediction queue 15, for subsequent fetching by the fetch unit 20 for provision to the processing circuitry 30 for execution. However, performance can be significantly impacted in instances where mispredictions are made by the branch prediction circuitry 10. Mispredictions can arise for a variety of reasons, but one particular area of concern discussed herein is a situation where a predict block contains more active branch instructions than the associativity of the BTB 42. By way of specific example, as mentioned earlier the predict block may contain eight consecutive instructions, but the associativity of the BTB 42 will typically be less than eight, and for example may be four or two. The associativity of the BTB may be chosen taking into account the normal expected maximum number of branch instructions within a predict block. For example, if typically a predict block will not have more than two branch instructions, it may be appropriate to arrange the BTB 42 as a two-way set associative structure, whilst if predict blocks will typically not have more than four branch instructions it may be appropriate to arrange the BTB 42 as a four-way set associative structure. It is desirable from a power consumption point of view to keep the associativity of the BTB relatively low, as each access will typically require a lookup to be performed within each of the ways of the BTB, and hence power consumption increases significantly as the associativity of the BTB increases.

A problem that can then arise is that certain predict blocks may comprise more branch instructions than the associativity of the BTB. This can lead to thrashing within the associated set of the BTB, where information is continually being evicted to make way for other target address information, and that other target address information is then being evicted to make way for target address information of another branch instruction within the predict block. By way of specific example, if the BTB is a four-way set associative structure, and hence there are four entries in the associated set, but there are six active branch instructions within the predict block, it will be appreciated that there may be a significant churn of allocations and evictions within that associated set in order to seek to capture within the BTB the target address information for the active branch instructions. It has been found that such situations can give rise to a significant reduction in the prediction accuracy of the branch prediction circuitry 10. In particular, there is a significant likelihood that the BTB 42 will not be able to provide target address information for the first branch instruction that is predicted as taken within that predict block during any particular prediction iteration, and hence if in due course the processing circuitry executes that branch instruction and determines that it is taken, the instruction at the target address is not available from the fetch unit 20, resulting in the need to flush the pipeline and refetch instructions from the determined target address.

The techniques described herein enable the prediction accuracy in such situations to be significantly enhanced, without increasing the associativity of the BTB 42. In particular, a further prediction structure is employed within the branch prediction circuitry 10, referred to herein as the high branch density (HBD) tracker 46. The HBD tracker is used to identify, as an HBD predict block, a predict block whose sequence of instructions contains more than N branch instructions. Further, for each HBD predict block identified by the HBD tracker, at least one additional set is identified in the BTB 42 to be used in addition to the associated set to identify target addresses for branch instructions within the HBD predict block.

Figure 2:
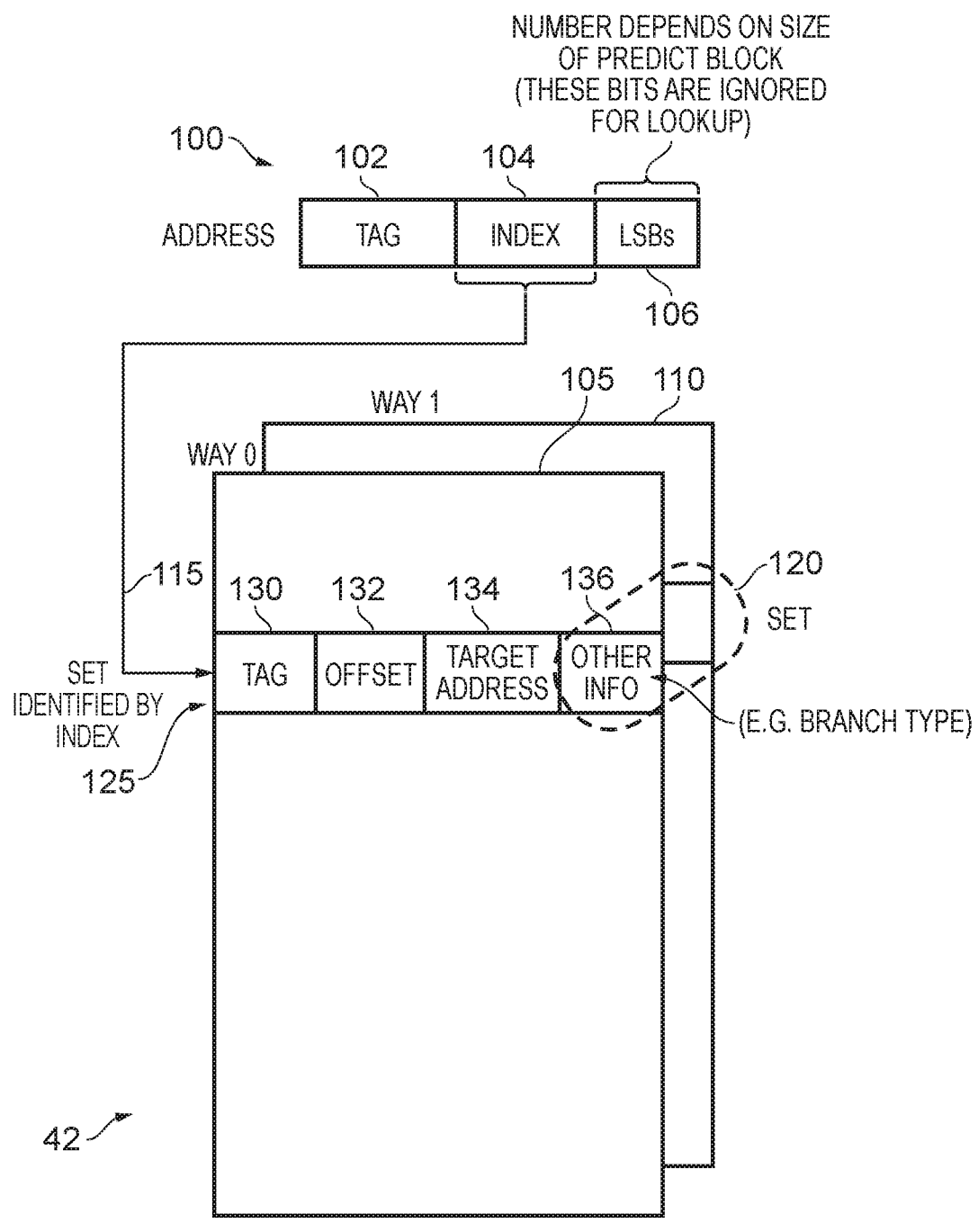
FIG. 2 schematically illustrates the arrangement of the branch target buffer in one example implementation.

The use of the HBD tracker will be discussed in more detail later with reference to FIGS. 3 to 10, but first FIG. 2 will be used to illustrate the arrangement of the BTB 42. In the example illustrated in FIG. 2, the BTB 42 is a two-way set associative structure consisting of the two ways 105, 110. Each set 120 within the BTB is identified by an entry in each of the two ways 105, 110. An address 100 associated with a current predict block can be used to perform a lookup within the BTB 42. In particular, the address 100 may consist of the tag portion 102, an index portion 104, and a final portion 106 containing a number of least significant bits. The number of bits in the final portion 106 is dependent on the size of the predict block, and hence the number of instructions within the predict block. The bits in the final portion 106 are ignored for the purposes of a lookup with the BTB, since the lookup pertains to the entire predict block, and not to any particular instruction within the predict block.

The index portion 104 is used to identify an index 115 that identifies an associated set within the target prediction storage, in this example the set 120. Each entry within the set stores particular information, as indicated by way of example with reference to the entry 125. In particular, a tag portion 130 stores the tag value, hence identifying the predict block to which that entry relates. In particular, it should be noted that because the index portion is used to identify an associated set, that index portion may be shared amongst multiple predict blocks, and the comparison of the tag portion 102 of the address 100 with the tag value in the tag field 130 can be used to identify whether that entry's contents do or do not relate to the predict block in question. In the event that the tag values match, this indicates that the entry does relate to the predict block in question.

A field 132 then provides an offset value, to identify the particular instruction position within the predict block to which the entry relates, and the field 134 provides target address information sufficient to enable a target address to be determined for the branch instruction at that instruction position within the predict block. The target address information can be specified in a variety of ways. For example, it could specifically identify the entire target address, but alternatively may provide some offset information that can be added to a base address in order to determine the target address. If desired, one or more other fields 136 may be provided to provide other information that is relevant to the branch prediction circuitry, for example the type of the branch instruction appearing at the offset position within the predict block. This may for example identify whether the branch instruction is an immediate branch, an indirect branch, a call instruction, a return instruction, etc.

For each entry within the set for which a hit is detected during the lookup procedure, then the information within the fields 132, 134, 136 can be output to the ordering logic 50 for use in combination with the branch direction prediction information from the branch direction predictor 44 when seeking to make a prediction for the current predict block.

The HBD tracker 46 may comprise a plurality of HBD entries, where each HBD entry is allocated to identify a predict block for which at least one entry has been allocated within the BTB 42. The HBD tracker is then arranged, for a given predict block that has been allocated a HBD entry, to monitor allocation activity within the entries of the BTB for that given predict block in order to identify whether that given predict block should be identified as an HBD predict block or not.

Figure 3:
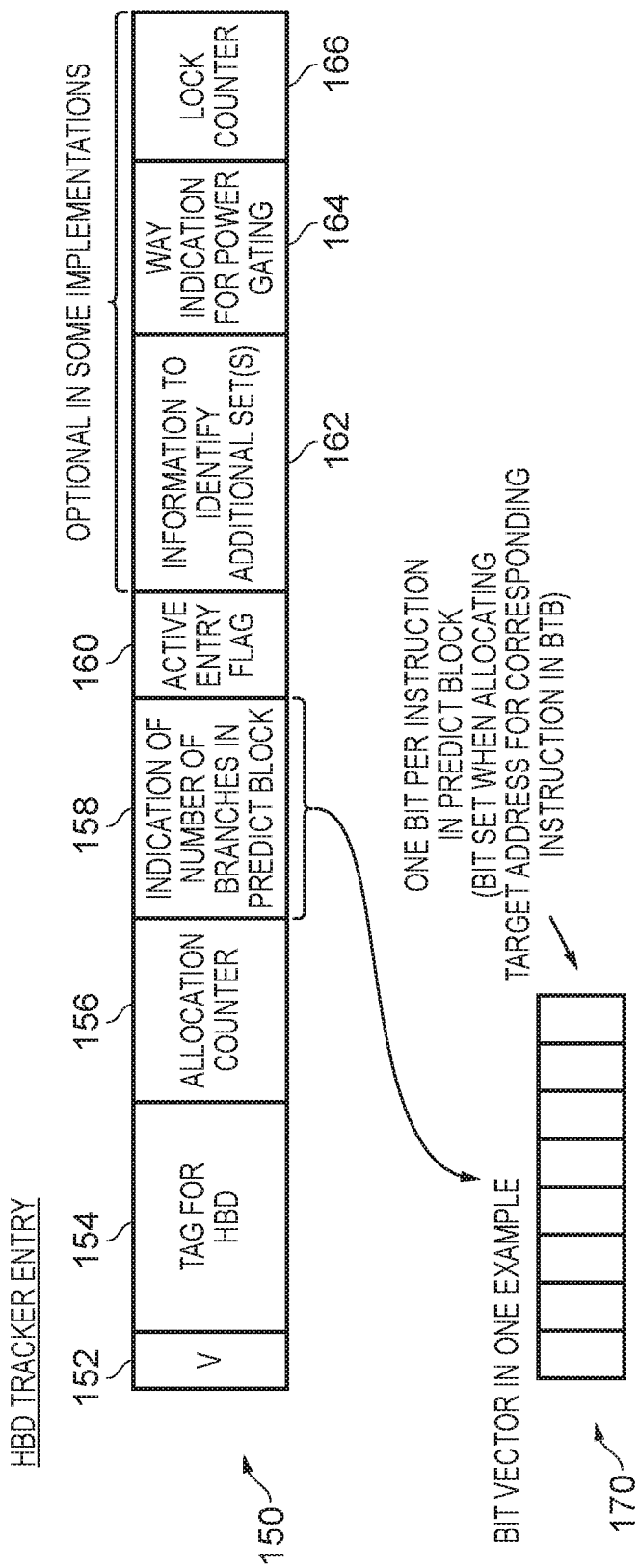
FIG. 3 schematically illustrates fields that may be provided within each entry of the high branch density tracker of FIG. 1 in accordance with one example arrangement.

FIG. 3 schematically illustrates fields that may be provided within each HBD entry 150 within the HBD tracker 46. A valid field 152 is used to identify whether the HBD entry is valid or not, and a field 154 is used to store tag information for the HBD entry. It should be noted that the HBD tracker can be organised in a variety of ways. For example, it could be a fully associative structure where any predict block can be stored in any entry, and in that instance the tag information effectively forms the entirety of the address for the predict block (i.e. both portions 102 and 104 of the address 100 shown in FIG. 2). However, alternatively the HBD tracker could be arranged as a set associative structure, although it will be appreciated that the level of associativity is a matter of design choice, and can be different to the associativity of the BTB 42. In that event, the index portion of the address used to perform a lookup in the HBD tracker 46 may be different to the index portion 104 used when performing a lookup within the BTB, and as a result the tag portion stored within the field 154 may be different to the tag portion 102 illustrated earlier in FIG. 2 in relation to the BTB 42.

An allocation count field 156 is used to maintain an allocation count value that is used when determining whether the allocated predict block should be treated as an HBD predict block. In addition, a branch count field 158 is used to indicate the number of branches in the predict block. This information can take a variety of forms. For example, it can be based on feedback information received from the processing circuitry 30 identifying the actual number of branch instructions within the given predict block. Alternatively, it may be an indication added during an update process to the BTB, in situations where a read-modify-write process is used in order to perform a update to the BTB entry, and hence at the time of performing an update it can be determined how many entries within the associated set already relate to the current predict block, and hence whether the new entry being allocated during the update indicates that the number of branch instructions exceeds the associativity of the BTB.

However, in one particular example implementation, the information held in the field 158 comprises a bit vector 170 comprising one bit per instruction within the predict block. Hence, considering the earlier example where there are eight instructions in a predict block, the bit vector may be an 8-bit vector. The bit vector is arranged as a sticky bit vector, such that once a bit has been set, that bit remains set until the HBD tracker entry is invalidated. At the time the entry is initially allocated, all of the bits are cleared, and then each time an allocation is made into the BTB 42 for the associated predict block, the associated offset information identifying the instruction position is used to cause the corresponding bit in the bit vector 170 to be set. As will be discussed in more detail later with reference to FIG. 4, in one embodiment the information in the branch number field 158 is used in combination with the allocation counter field 156 to determine when a trigger condition is reached where the predict block allocated into the HBD entry 150 is to be considered as an HBD predict block.

An active entry flag 160 may be provided, which is initially cleared, and which is set once it has been determined that the predict block allocated into that entry is to be treated as an HBD predict block. As also shown in FIG. 3, a number of optional additional fields 162, 164, 166 may be provided if desired. In particular, the field 162 may provide information that is used to identify each additional set that is to be used for allocating target address information for the HBD predict block within the BTB 42, in addition to the associated set identified using the address information of the predict block. In some implementations, the number of additional sets may be predetermined, for example it may be predetermined that one additional set is used in addition to the associated set. Further, that additional set may be identified merely by performing a predetermined manipulation of the index bits 104 used to identify the associated set. For example, in a banked implementation having two banks, one of the index bits will identify the bank, and that bit can merely be flipped in order to identify the additional set. Hence, the associated set will be in one bank, and the additional set will be in an additional bank. In such implementations, there is no need for the field 162, since the additional set can be identified directly from the index portion of the address identifying the predict block.

However, in other implementations there may be more flexibility as to choice of the additional set, and information can be provided in the field 162 to identify how the index for each additional set is determined. For example, that index information may be identified directly, or some offset information could be provided to identify how the original index 104 of the address 100 of the predict block is manipulated in order to identify each additional set. In instances where more than one additional set may be provided, then the field 162 can also be supplemented to identify the number of additional sets that are to be provided. This can provide some additional flexibility. For example, in instances where the BTB is a two-way set associative storage structure, then if it is determined using the information in the field 158 that there are more than four branch instructions within the associated predict block, it may be appropriate to identify more than one additional set into which target address information can be stored.

The way indication field 164 enables a subset of the ways in each additional set to be identified as the ways into which target address information for branch instructions within the predict block will be allocated. This can be useful in situations where it is determined that it is not necessary to allow the entirety of an additional set to be used, and can give rise to power consumption benefits, for example by enabling power gating techniques to be used when performing lookup operations within each additional set so that the lookup is constrained to only the ways in which a hit may be detected.

Finally, a lock counter field 166 can be employed to provide a lock counter value that is used to enable an entry containing an HBD predict block to persist for a period of time even after it has been selected as a victim entry, so that the contents are not immediately overwritten when the entry is selected as a victim entry. This process will be discussed in more detail later with reference to FIG. 5.

Figure 4:
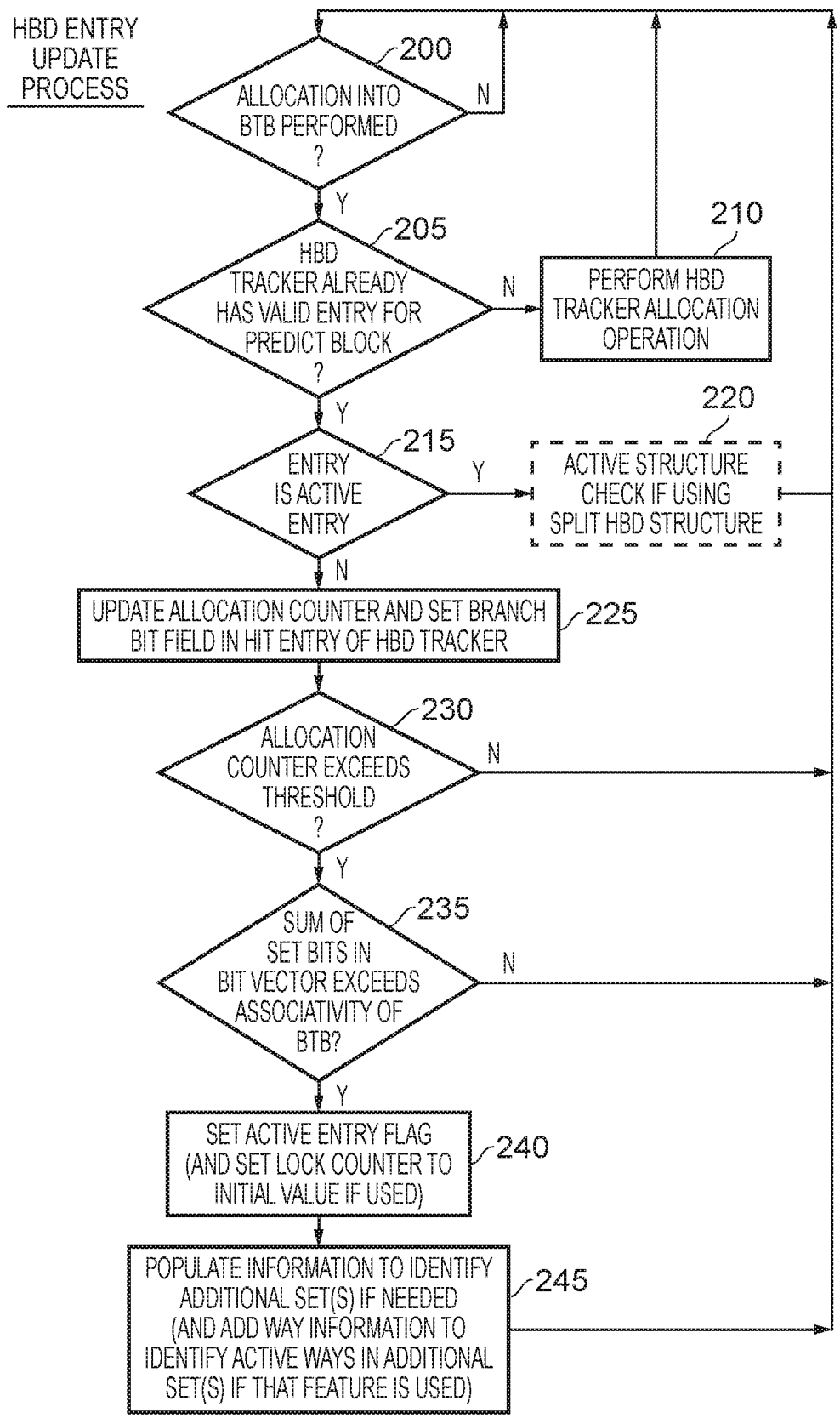
FIG. 4 is a flow diagram illustrating how entries within the high branch density tracker are updated, in accordance with one example arrangement.

FIG. 4 is a flow diagram illustrating an HBD entry update process. At step 200 it is determined whether an allocation into the BTB 42 is being performed. When that is the case, then a lookup is performed within the HBD tracker 46 at step 205 to determine whether the HBD tracker already has a valid HBD entry for the predict block in question. If not, then the process proceeds to step 210 where an HBD tracker allocation operation is performed, this operation being discussed in more detail later with reference to FIG. 5.

Figure 9:
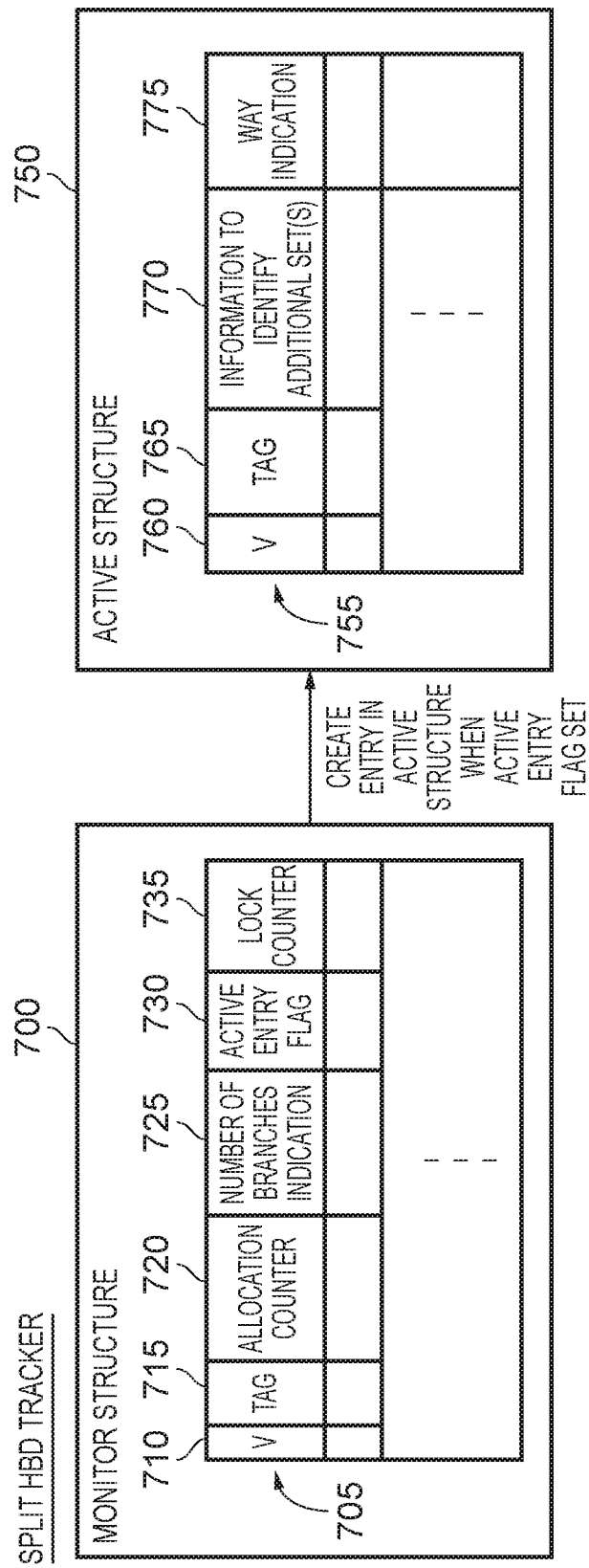
FIG. 9 schematically illustrates an alternative configuration for the high branch density tracker, where the tracker is split into separate monitor and active structures, in accordance with one example arrangement.
Figure 10:
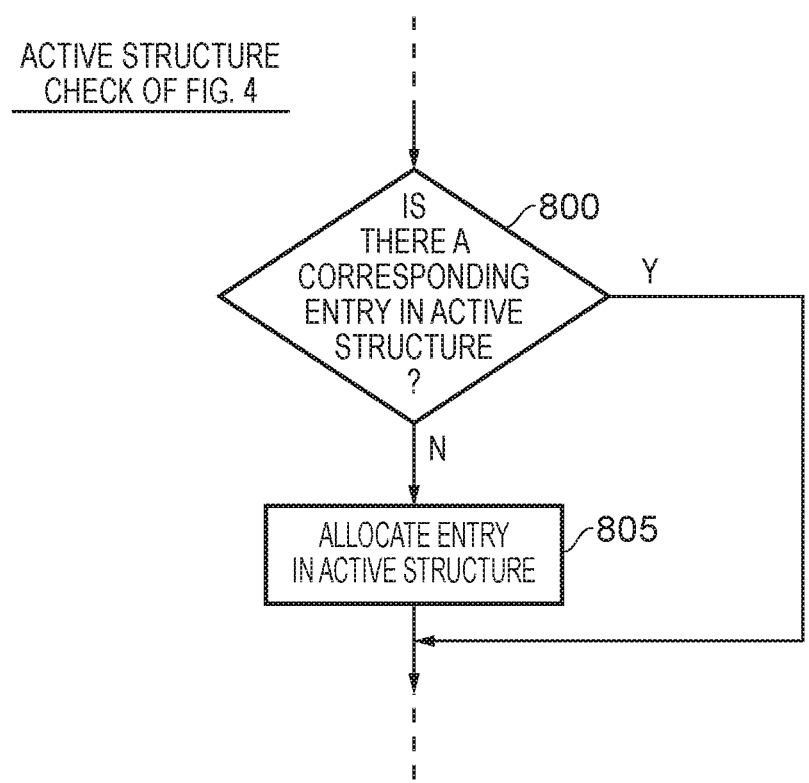
FIG. 10 illustrates steps that may be performed in order to implement step 220 of FIG. 4 in situations where the high branch density tracker is arranged as shown in FIG. 9, in accordance with one example arrangement.

However, assuming a valid entry within the HBD tracker already exists, the process proceeds to step 215 where it is determined whether that entry is an active entry. With reference to FIG. 3, this can be determined with reference to the active entry flag field 160, and in particular if that active entry flag field is set this indicates that the entry is active, i.e. that the predict block is considered to be an HBD predict block. If the entry is an active entry, then no further steps are required other than an optional step 220 that may be implemented if the split HBD tracker arrangement to be discussed later with reference to FIG. 9 is employed. The additional steps performed at step 220 will be discussed later with reference to FIG. 10.

Assuming the entry is not yet an active entry, then at step 225 the allocation counter in the field 156 is updated, and in addition the relevant bit within the bit vector 170 of the branch number field 158 is set. As discussed earlier, this can be determined from the offset information that is to be used to populate the entry in the BTB 42, i.e. the information that identifies the particular instruction position within the predict block to which the allocation relates.

At step 230, it is then determined whether the allocation counter has exceeded the threshold, and if not the process returns to step 200. However, if the allocation now exceeds the threshold, it is determined at step 235 whether the sum of the set bits in the bit vector 170 exceeds the associativity of the BTB. If not, no further steps are required and the process again returns to step 200. However, if the sum of the set bits does exceed the associativity of the BTB, then at step 240 the active entry flag is set. Further, in implementations that use the lock counter field 166, the lock counter value is set to an initial value. Further, at step 245, additional information can be populated within the HBD entry to identify each additional set, if that information is not predetermined. Also, if the way indication field 164 is employed, then way information can be added into that field to identify the active ways. The process then returns to step 200.

Figure 5:
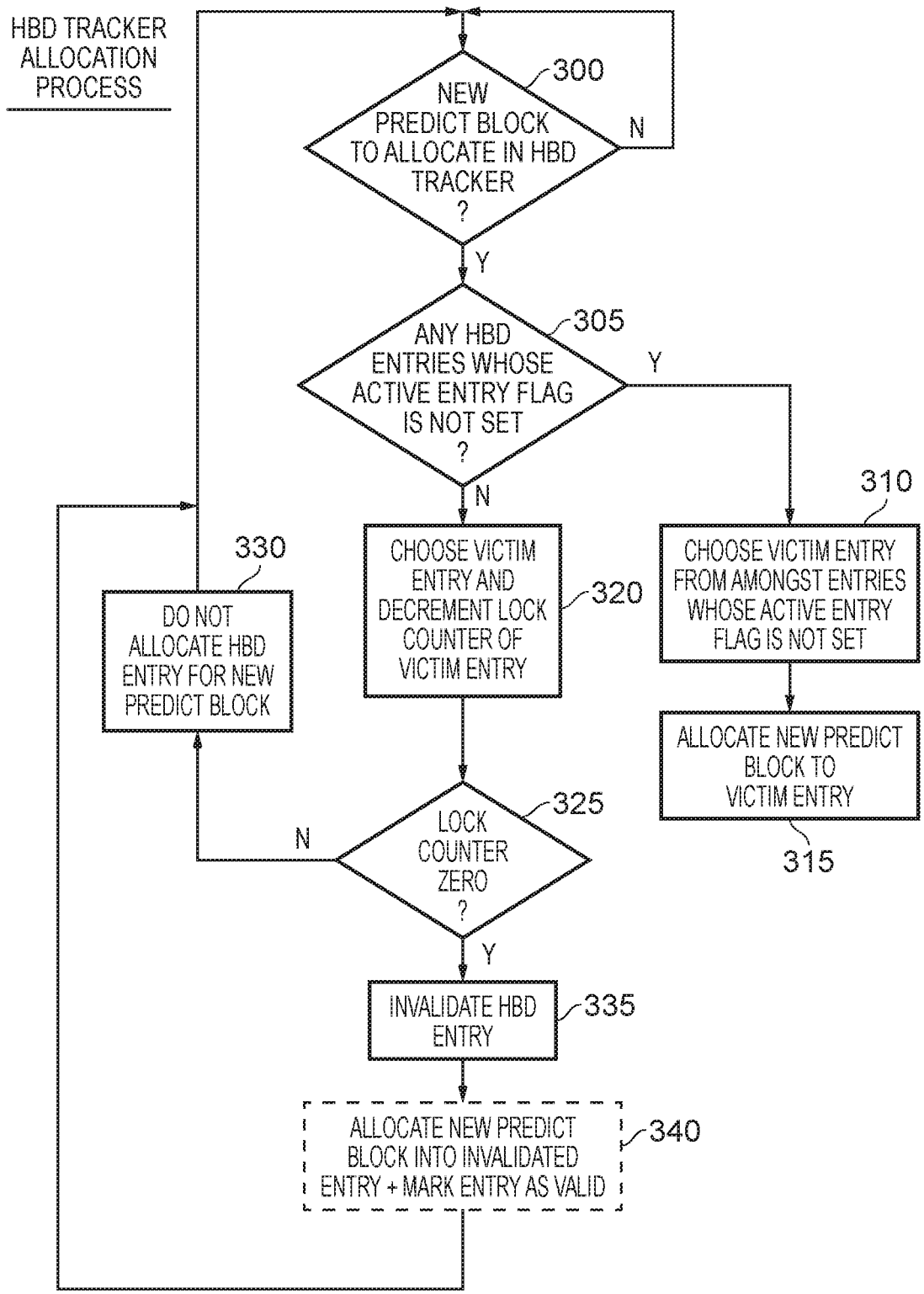
FIG. 5 is a flow diagram illustrating a process performed in order to seek to allocate an entry within the high branch density tracker in accordance with one example arrangement.

FIG. 5 is a flow diagram illustrating the HBD tracker allocation process performed at step 210 of FIG. 4. At step 300 it is determined whether a new predict block is identified for allocation in the HBD tracker, and if so the process proceeds to step 305 where it is determined whether there are any HBD entries whose active entry flag is not set. If so, the process proceeds to step 310 where a victim entry is chosen from amongst the entries whose active entry flag is not set. In particular, in this example implementation victim entries are preferentially chosen from amongst any entries that do not yet identify an HBD predict block. Then, at step 315 the information for the new predict block is allocated to the victim entry, overwriting the existing contents of that entry. At this point, the field 154 will be updated to identify the relevant tag information for the new predict block, and the valid field 152 will be set to valid. All of the other fields may initially be cleared.

If at step 305 it is determined that all of the HBD entries are associated with active entries, then the process proceeds to step 320 where a victim entry is chosen from amongst those entries and the lock counter within the lock counter field 166 of the victim entry is decremented. In particular, in this example implementation, at step 240 in FIG. 4 the lock counter will have been set to an initial positive value when the active entry flag was set, i.e. at the time the predict block was identified as being an HBD predict block, and then at step 320 the current value of the lock counter is decremented. It is then determined at step 325 whether the lock counter is zero. If it is not yet zero, the process proceeds to step 330 where an HBD entry is not allocated for the new predict block, and instead the process returns to step 300. Hence, at this point it has been decided to be preferential to keep the existing entry, rather than overwriting it with the information for a new predict block, given that it is not known whether the new predict block will or will not turn out to be an HBD predict block.

Depending on the initial value to which the lock counter is set, it will be appreciated that such an approach enables an HBD predict block entry to be chosen as a victim entry multiple times before the lock counter will eventually reach a zero value, at which point that victim entry will then be chosen for the new allocation, and the existing contents will be overwritten with the corresponding information for a new predict block. In particular, when at step 325 it is determined that the lock counter is zero, then the HBD entry will be invalidated at step 335. At this point, the process could return to step 300 without allocating the new predict block, or alternatively step 340 can be performed in order to allocate the information for the new predict block into the invalidated entry, at which point that entry will then be remarked as valid, and then the process will return to step 300.

When selecting victim entries at step 310 or step 320 it will be appreciated that any suitable selection process may be used to select the victim entry from amongst the candidate entries being considered. By way of specific example, a least recently used scheme could be used in order to select the victim entry.

Figure 6:
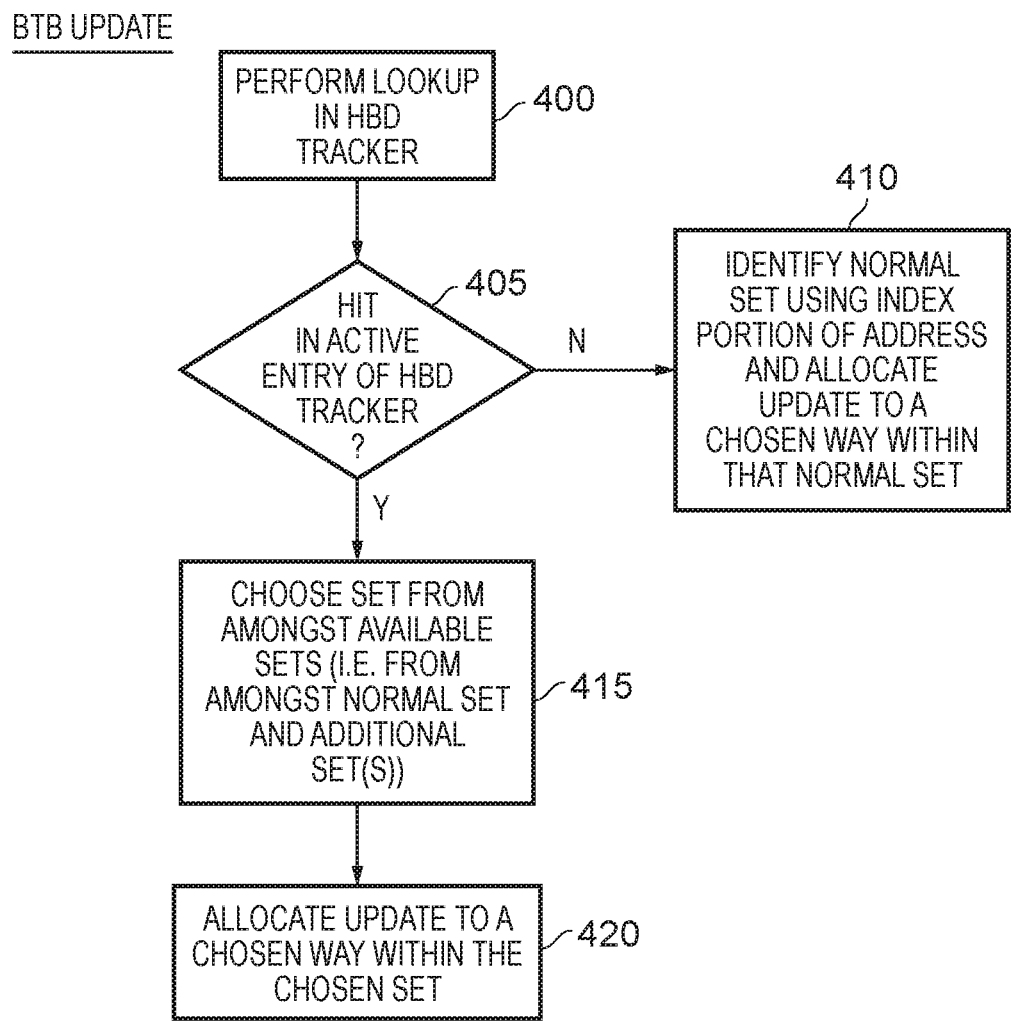
FIG. 6 is a flow diagram illustrating an update process performed in respect of an entry within the branch target buffer of FIG. 1, in accordance with one example arrangement.

FIG. 6 is a flow diagram illustrating a BTB update process. In particular, when it is desired to perform an update into the BTB, in order to store target address information for a branch instruction, a lookup is performed in the HBD tracker at step 400 in order to see whether information about that predict block is stored within the HBD tracker. In particular, at step 405 it is determined whether there has been a hit in an active entry of the HBD tracker. If this is not the case, either because there is no hit at all, or there is a hit in an entry that is not yet marked as an active entry, the process proceeds to step 410 where the normal set (i.e. the earlier mentioned associated set) is identified using the index portion of the address, and the update is allocated into a chosen way within that normal set. A standard replacement policy can be used here, such as least recently used, in order to determine the victim entry within the associated set that is to be used for allocating the target address information of the update.

However, if a hit is detected in an active entry of the HBD tracker, the process proceeds to step 415 where a set is chosen from amongst the available sets. In particular it will be appreciated that for an active entry there will be at least one additional set, and hence there will be both the normal set and at least one additional set available for selection here. Which set is chosen is a matter of design implementation, and in one particular implementation the set may be chosen randomly at step 415. Once the set has been chosen, the process then proceeds to step 420 where the update is allocated to a chosen way within the chosen set. How the victim entry is selected at this point is a matter of design implementation, and any standard replacement policy could be used, such as the earlier-mentioned least recently used policy.

Figure 7:
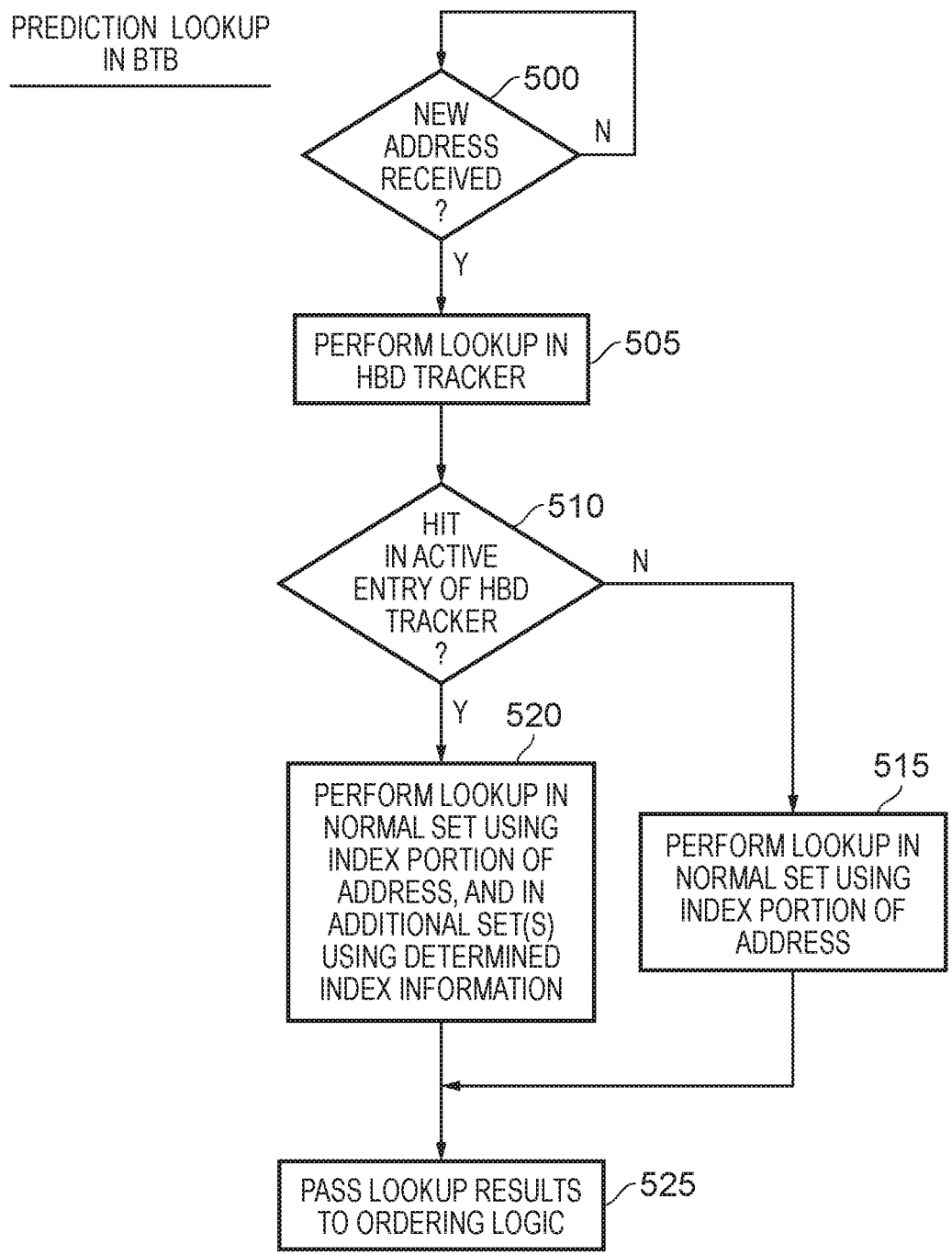
FIG. 7 is a flow diagram illustrating a prediction lookup process performed within the branch target buffer of FIG. 1 in accordance with one example arrangement.

FIG. 7 is a flow diagram illustrating a prediction lookup procedure performed within the BTB in accordance with one example implementation. At step 500, receipt of a new address is awaited, which as mentioned earlier may take the form of an address forwarded over path 52 from the ordering logic 50 to identify the next predict block. A lookup is then performed at step 505 within the HBD tracker, and at step 510 it is determined whether there is a hit in an active entry of the HBD tracker. If not, then this indicates that there are no additional sets to consider, and the process proceeds to step 515 where a lookup is performed in the normal set using the index portion of the address. However, if there is a hit in an active entry of the HBD tracker 510, then this means that there is at least one additional set, and at step 520 the lookup is performed in both the normal set using the index portion of the address, and also in any additional sets identified by the active HBD entry using the determined index information for each additional set. Following either step 515 or 520, then the lookup results are passed to the ordering logic 50 at step 525.

Figure 8:
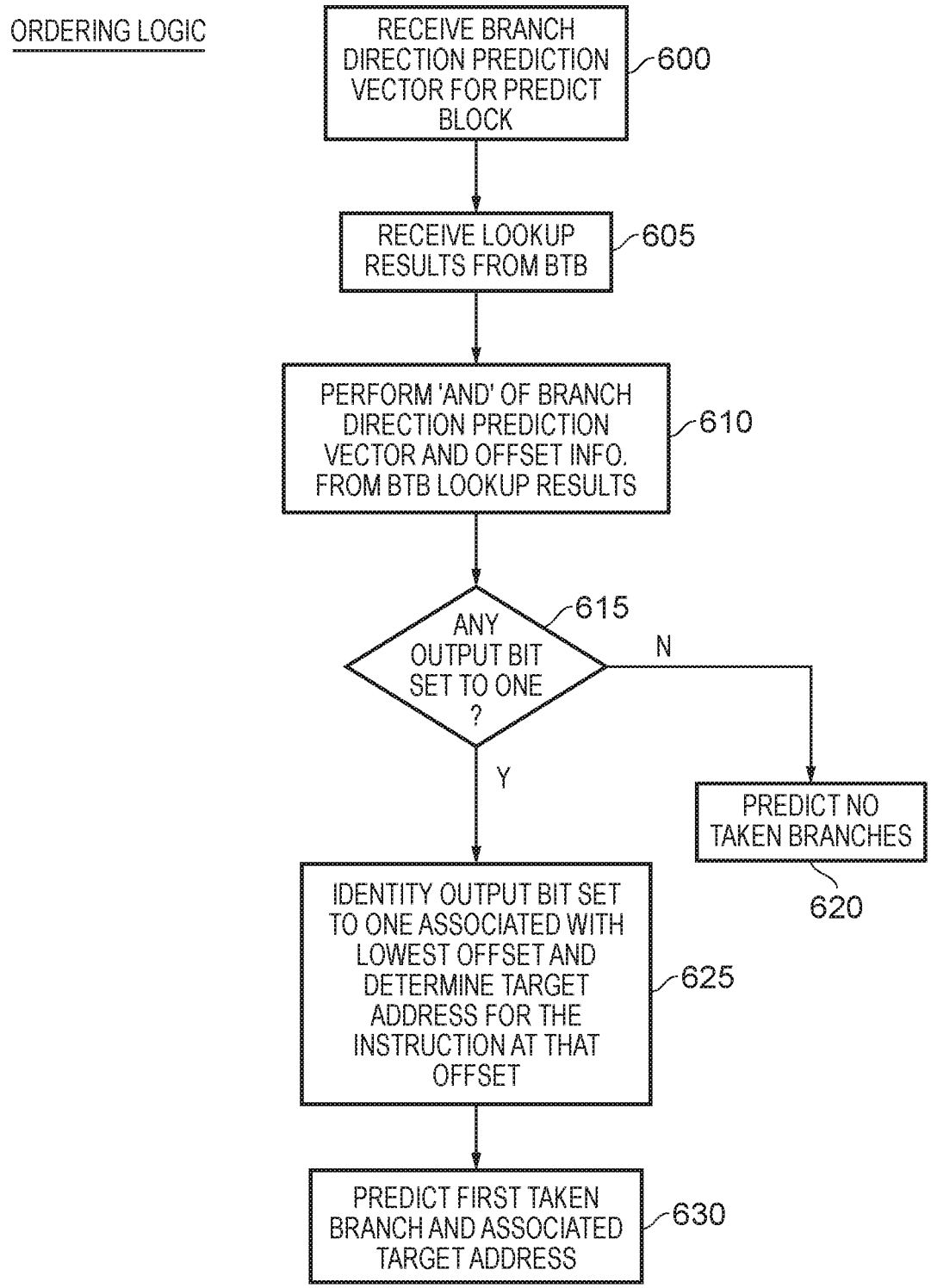
FIG. 8 is a flow diagram illustrating the operation of the ordering logic of FIG. 1 in accordance with one example arrangement.

FIG. 8 is a flow diagram illustrating the operation of the ordering logic 50 in one example implementation. At step 600, the branch direction prediction vector is received from the branch direction predictor 44 for the current predict block. At step 605 the lookup results are also received from the BTB 42, these having been obtained using the process discussed above with reference to FIG. 7. At step 610, a logic AND operation of the branch direction prediction vector and the offset information from the BTB lookup results is performed. In particular, at this point the ordering logic is seeking to determine whether there is any branch instruction that is both predicted as taken, and for which target address has been output by the BTB 42.

At step 615, it is determined whether any output bit from that AND operation is set to a logic one value, this identifying that at least one branch instruction has been predicted as taken for which there is a target address available from the BTB 42. If not, the process proceeds to step 620 where no taken branches are predicted, this information being used to update the prediction queue with the instruction address for one or more sequential instructions terminating with the final instruction in the predict block.

However, if there is at least one output bit set to one, the process proceeds to step 625 where the ordering logic 50 identifies the output bit that is set to one associated with the lowest offset, i.e. the first branch instruction within the predict block that is predicted as taken and for which a target address is available. The target address is then determined for the instruction at that offset. Hence, at step 630 the first taken branch is predicted, along with the associated target address. This information is then used to update the prediction queue, by identifying addresses for one or more instructions in a sequence terminating with that branch instruction. The target address information is then used to identify the next predict block over path 52 to the prediction structures 40 of the branch prediction circuitry 10.

In one example implementation, the HBD tracker has a unitary structure, such that each entry is as illustrated by the entry 150 of FIG. 3. However, in an alternative implementation a split HBD tracker may be implemented, as schematically illustrated in FIG. 9. In such an implementation, the HBD tracker includes a monitor structure 700 comprising a plurality of monitor entries 705, and an active structure 750 comprising a plurality of active entries 755. When an HBD entry is initially allocated within the HBD tracker, a monitor entry 705 is allocated. Each monitor entry 705 may contain the information illustrated in FIG. 9. Hence, a valid flag 710, tag field 715, allocation counter field 720, number of branches indication field 725, active entry flag field 730 and lock counter field 735 may be provided, these storing the information discussed earlier with reference to the fields 152, 154, 156, 158, 160 and 166 of FIG. 3. Thus, when performing the allocation process of FIG. 5, if an HBD entry is allocated for the new predict block, then at this point only a monitor entry 705 will be allocated within the monitor structure 700. That monitor entry is then used during the training phase, i.e. where the HBD entry is being updated using the process of FIG. 4 based on tracking the allocation activity within the BTB.

However, at the time it is decided at step 240 of FIG. 4 to set the active entry flag and the lock counter, then an active entry 755 within the active structure 750 is also at that point allocated to capture the information shown in FIG. 9. In particular, the valid and tag information held in the field 710, 715 of the monitor entry is replicated within the fields 760, 765 of the allocated active entry 755. The fields 770 and 775 are then used to capture the additional set information and the way indication information discussed earlier with reference to the fields 162, 164 of FIG. 3. If desired, at this point the original monitor entry can be invalidated (in such an implementation the active entry flag field 730 is not needed), but in an alternative embodiment both the monitor entry and the active entry can remain valid at that point. When subsequently performing the BTB update or prediction lookup processes of FIG. 6 or 7, the lookup within the HBD tracker only needs to perform a lookup within the active entries 755 of the active structure 750.

It will be appreciated that, over time, it may be necessary to invalidate an active entry 755 in order to make space for a newly allocated active entry within the active structure 750. If the original associated monitor entry has already been invalidated, then the information relating to the HBD predict block that has now been overwritten in the active entry will be lost, and it will be necessary in due course to reallocate an entry in the monitor structure, to perform the training phase to determine that the entry should be set as an active entry, and in due course to repopulate an active entry 755, this assuming of course that that predict block is still actively being used. However, in implementations where the original monitor entry is kept when the active entry is allocated, it is possible that scenarios can arise where the active entry has been evicted, but the monitor entry for the same predict block still exists. In such instances, the earlier discussed step 220 of FIG. 4 can be performed in situations where it is determined at step 215 that the entry is an active entry. In particular, when the active entry flag 730 is set within an entry that is already allocated for the predict block in question, then the process of FIG. 10 can be performed in order to implement step 220 of FIG. 4. In particular, at step 800 it can be determined if there is a corresponding entry in the active structure. This should normally be the case, unless the contents of that entry have been evicted as discussed earlier. Hence, if there is a corresponding entry in the active structure, no further steps are required, but if there is not, then at step 805 an entry is reallocated in the active structure 750.

From the above described examples, it will be appreciated that through the use of the HBD tracker it is possible to accommodate situations where there are a few predict blocks whose number of active branch instructions exceeds the associativity of the BTB. In particular, one or more additional sets can be allocated within the BTB for use in association with such HBD predict blocks, enabling target address information to be captured within the BTB for a larger number of branch instructions within the predict block than the associativity of the BTB. This can significantly increase prediction accuracy for such predict blocks, without a requirement to increase the associativity of the BTB, which could have a drastic power increase associated therewith. Whilst such predict blocks may occur only relatively infrequently, it has been found that, without the use of the technique described herein, those predict blocks can give rise to a significant decrease in performance, due to the mispredictions that would arise when using a standard approach. The technique described herein has additional benefits, as it can increase programming design freedom, for example by allowing the compiler to form a predict block that contains all taken branches, hence enabling that predict block to be used as a "landing" predict block where an instruction branches to a particular instruction within the predict block, that in turn then branches to another section of code.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a prediction queue to identify instructions to be fetched for execution by processing circuitry; and
branch prediction circuitry to make predictions in respect of branch instructions, and to control which instructions are identified in the prediction queue in dependence on the predictions;
wherein:
the branch prediction circuitry is arranged, during each prediction iteration, to make a prediction for a predict block comprising a sequence of M instructions, in order to identify whether that predict block contains a branch instruction that is predicted as taken;
the branch prediction circuitry comprises a target prediction storage having a plurality of entries that are used to identify target addresses for branch instructions that are predicted as taken, wherein the target prediction storage is arranged as an N-way set associative storage structure comprising a plurality of sets, each set comprises an entry from each way of the N-way set associative storage structure, and each predict block has an associated set within the target prediction storage; and
the branch prediction circuitry further comprises a high branch density (HBD) tracker arranged to identify, as a HBD predict block, a predict block whose sequence of M instructions contains more than N branch instructions, for each HBD predict block identified by the HBD tracker at least one additional set being identified in the target prediction storage to be used in addition to the associated set to identify target addresses for branch instructions that are predicted as taken within that HBD predict block.

2. An apparatus as claimed in claim 1, wherein:
the HBD tracker has a plurality of HBD entries, each HBD entry being allocated to identify a predict block for which at least one entry has been allocated within the target prediction storage; and
the HBD tracker is arranged, for a given predict block that has an allocated HBD entry, to monitor allocation activity within the entries of the target prediction storage for that given predict block, in order to identify a trigger condition where that given predict block is to be identified as a HBD predict block.

3. An apparatus as claimed in claim 2, wherein:
each HBD entry comprises an allocation counter field to identify an allocation count indicative of a number of allocations made within the target prediction storage for the predict block allocated in that HBD entry; and the HBD tracker is arranged to prevent the trigger condition being identified until the allocation count reaches a threshold value.

4. An apparatus as claimed in claim 3, wherein:
each HBD entry comprises a branch threshold field to provide an indication of whether the predict block allocated in that HBD entry has more than N branch instructions; and
the HBD tracker is arranged to identify the trigger condition for the given predict block when both the branch threshold field indicates that the given predict block has more than N branch instructions and the allocation count for the given predict block has reached the threshold value.

5. An apparatus as claimed in claim 4, wherein:
the branch threshold field comprise an M-bit vector, where each bit is associated with an instruction position within the predict block;
the HBD tracker is arranged, in response to an entry being allocated within the target prediction storage for a branch instruction at a specified instruction position within the given predict block, to set within the M-bit vector the associated bit for that specified instruction position; and
the branch threshold field indicates that the given predict block allocated in that HBD entry has more than N branch instructions when the number of set bits in the M-bit vector exceeds N.

6. An apparatus as claimed in claim 5, wherein the M-bit vector is sticky, such that once a bit has been set that bit remains set until the HBD entry is invalidated.

7. An apparatus as claimed in claim 2, wherein:
each HBD entry contains an active flag which is set once the predict block allocated in that HBD entry is considered to be a HBD predict block.

8. An apparatus as claimed in claim 1, wherein:
the at least one additional set is determined with reference to the associated set.

9. An apparatus as claimed in claim 2, wherein:
each HBD entry contains an additional set number field to identify a number of additional sets to be used in addition to the associated set to identify target addresses for branch instructions that are predicted as taken within the HBD predict block allocated in that HBD entry.

10. An apparatus as claimed in claim 2, wherein:
each HBD entry contains an additional set identifier field to provide information used to determine each additional set to be used in addition to the associated set to identify target addresses for branch instructions that are predicted as taken within the HBD predict block allocated in that HBD entry.

11. An apparatus as claimed in claim 2, wherein:
each HBD entry provides way identifier information used to identify a subset of the ways in each additional set to be used to identify target addresses for branch instructions that are predicted as taken within the HBD predict block allocated in that HBD entry.

12. An apparatus as claimed in claim 2, wherein:
each HBD entry contains a lock counter field to provide a lock counter value, the lock counter value being set to an initial value when the predict block allocated into that entry is identified as a HBD predict block.

13. An apparatus as claimed in claim 12, wherein the lock counter value is adjusted by a predetermined amount each time the associated HBD entry is chosen as a victim entry during a HBD entry allocation process, but the information currently stored in the associated HBD entry is maintained as valid until the lock counter value reaches a final value.

14. An apparatus as claimed in claim 1, wherein the branch prediction circuitry is arranged, when allocating an entry within the target prediction storage for a branch instruction within a chosen predict block, to access the HBD tracker to determine whether the chosen predict block is a HBD predict block and, when the chosen predict block is a HBD predict block, to select the entry to be allocated for the branch instruction from amongst the entries in the associated set and the at least one additional set.

15. An apparatus as claimed in claim 1, wherein the branch prediction circuitry is arranged, when making a prediction for a current predict block, to determine with reference to the HBD tracker whether the current predict block is a HBD predict block and, when the current predict block is a HBD predict block, to perform a lookup in both the associated set and the at least one additional set in order to retrieve the target addresses for branch instructions that are predicted as taken within the current predict block.

16. An apparatus as claimed in claim 2, wherein:
the HBD tracker comprises a monitor storage structure comprising a plurality of monitor entries and an active storage structure comprising a plurality of active entries; and
each HBD entry is initially provided by a monitor entry in the monitor storage structure, but when the associated predict block allocated in that HBD entry is identified as a HBD predict block the HBD entry is arranged to at least comprise an active entry in the active storage structure.

17. An apparatus as claimed in claim 16, wherein when the associated predict block allocated in the HBD entry is identified as a HBD predict block, the HBD entry is expanded so as to comprise both the monitor entry and the active entry.

18. An apparatus as claimed in claim 1, wherein the branch prediction circuitry further comprises:
branch direction prediction circuitry to produce branch direction prediction information providing an indication of each branch instruction within a current predict block that is predicted as being taken; and
ordering circuitry to seek to determine whether there is at least one branch instruction in the current predict block that is predicted as taken and for which a target address is identified in the target prediction storage, and in the event that there is more than one branch instruction in the current predict block that is predicted as taken and for which a target address is identified in the target prediction storage, to determine a first of said more than one branch instructions appearing within the predict block.

19. A method of making predictions for branch instructions, comprising:
identifying within a prediction queue instructions to be fetched for execution by processing circuitry;
employing branch prediction circuitry to make predictions in respect of branch instructions, and to control which instructions are identified in the prediction queue in dependence on the predictions, wherein, during each prediction iteration, a prediction is made for a predict block comprising a sequence of M instructions, in order to identify whether that predict block contains a branch instruction that is predicted as taken;
providing a target prediction storage having a plurality of entries that are used to identify target addresses for branch instructions that are predicted as taken, wherein the target prediction storage is arranged as an N-way set associative storage structure comprising a plurality of sets, each set comprises an entry from each way of the N-way set associative storage structure, and each predict block has an associated set within the target prediction storage; and
providing a high branch density (HBD) tracker to identify, as a HBD predict block, a predict block whose sequence of M instructions contains more than N branch instructions, for each HBD predict block identified by the HBD tracker at least one additional set being identified in the target prediction storage to be used in addition to the associated set to identify target addresses for branch instructions that are predicted as taken within that HBD predict block.

20. An apparatus comprising:
prediction queue means for identifying instructions to be fetched for execution by processing circuitry; and
branch prediction means for making predictions in respect of branch instructions, and to control which instructions are identified in the prediction queue means in dependence on the predictions;
wherein:
the branch prediction means, during each prediction iteration, for making a prediction for a predict block comprising a sequence of M instructions, in order to identify whether that predict block contains a branch instruction that is predicted as taken;
the branch prediction means comprises a target prediction storage means having a plurality of entries for identifying target addresses for branch instructions that are predicted as taken, wherein the target prediction storage means is arranged as an N-way set associative storage structure comprising a plurality of sets, each set comprises an entry from each way of the N-way set associative storage structure, and each predict block has an associated set within the target prediction storage means; and
the branch prediction means further comprises a high branch density (HBD) tracker means for identifying, as a HBD predict block, a predict block whose sequence of M instructions contains more than N branch instructions, for each HBD predict block identified by the HBD tracker means at least one additional set being identified in the target prediction storage means to be used in addition to the associated set to identify target addresses for branch instructions that are predicted as taken within that HBD predict block.

* * * * *